(12) United States Patent
Bensilum et al.

(10) Patent No.: US 9,341,082 B2
(45) Date of Patent: May 17, 2016

(54) PIPE HAVING AN UPSTREAM CORE HAVING A SHARP CURVATURE

(75) Inventors: Stephane Emmanuel Daniel Bensilum, Alfortville (FR); Jean Bertucchi, Thiais (FR); Mathieu Gaillot, Paris (FR)

(73) Assignee: SNECMA, Paris (FR)

( * ) Notice: Subject to any disclaimer, the term of this patent is extended or adjusted under 35 U.S.C. 154(b) by 465 days.

(21) Appl. No.: 14/003,180

(22) PCT Filed: Mar. 2, 2012

(86) PCT No.: PCT/FR2012/050447
§ 371 (c)(1),
(2), (4) Date: Sep. 4, 2013

(87) PCT Pub. No.: WO2012/120227
PCT Pub. Date: Sep. 13, 2012

(65) Prior Publication Data
US 2013/0336772 A1 Dec. 19, 2013

(30) Foreign Application Priority Data
Mar. 4, 2011 (FR) ...................... 11 51782

(51) Int. Cl.
*F01D 1/00* (2006.01)
*F01D 25/24* (2006.01)
(Continued)

(52) U.S. Cl.
CPC ............... *F01D 25/24* (2013.01); *B64D 33/04* (2013.01); *F02K 1/00* (2013.01); *F02K 1/82* (2013.01); *F05D 2250/71* (2013.01); *F05D 2250/711* (2013.01); *Y02T 50/671* (2013.01)

(58) Field of Classification Search
USPC ............... 415/108, 182.1, 196, 203, 219.1; 60/776, 770, 39.58, 760
See application file for complete search history.

(56) References Cited

U.S. PATENT DOCUMENTS 3,829,020 A   8/1974   Stearns
3,881,315 A   5/1975   Hess et al.
(Continued)

FOREIGN PATENT DOCUMENTS

EP   1 031 510   8/2000
EP   1 619 376   1/2006
(Continued)

OTHER PUBLICATIONS

International Search Report Issued Jun. 18, 2012 in PCT/FR12/50447 Filed Mar. 4, 2012.

*Primary Examiner* — Binh Q Tran
(74) *Attorney, Agent, or Firm* — Oblon, McClelland, Maier & Neustadt, L.L.P.

(57) ABSTRACT

A turbine engine pipe having a longitudinal axis, which, at an upstream end thereof, includes an outer wall and a core, only an upstream portion of which is surrounded by the outer wall. The boundary between the upstream portion and a downstream portion is defined by the intersection between the core and the surface formed by bisectors of acute angles formed by straight lines perpendicular to the outer wall and straight lines perpendicular to an outer surface of the core passing through the downstream end of the outer wall. The outer surface of the downstream portion of the core has a sharply curved convex region close to the boundary, the region having a radius of curvature in a radial plane of less than 30 times the radius of the core at the boundary, and a first slightly curved region between the boundary and the sharply curved convex region.

9 Claims, 1 Drawing Sheet

(51) Int. Cl.
*B64D 33/04* (2006.01)
*F02K 1/00* (2006.01)
*F02K 1/82* (2006.01)

(56) References Cited

U.S. PATENT DOCUMENTS

| | | | |
|---|---|---|---|
| 3,897,001 A | 7/1975 | Helmintoller, Jr. et al. | |
| 4,073,440 A | 2/1978 | Hapke | |
| 4,137,992 A | 2/1979 | Herman | |
| 4,802,629 A | 2/1989 | Klees | |
| 5,054,998 A | 10/1991 | Davenport | |
| 5,833,140 A * | 11/1998 | Loffredo | F02K 1/11 239/265.37 |
| 6,178,740 B1 | 1/2001 | Su et al. | |
| 7,735,601 B1 * | 6/2010 | Stieger | B64D 33/06 181/213 |
| 8,434,293 B2 * | 5/2013 | Widdle, Jr. | F02K 1/10 239/265.19 |
| 8,776,527 B1 * | 7/2014 | Sokhey | F02K 1/38 60/770 |
| 8,783,039 B2 * | 7/2014 | Conners | B64D 33/02 137/15.1 |
| 9,181,899 B2 * | 11/2015 | Dindar | B64D 33/04 |
| 2006/0016171 A1 | 1/2006 | Renggli | |
| 2008/0131276 A1 | 6/2008 | Alade et al. | |
| 2010/0050651 A1 | 3/2010 | Dindar et al. | |
| 2011/0308634 A1 | 12/2011 | Mouton et al. | |

FOREIGN PATENT DOCUMENTS

| | | |
|---|---|---|
| EP | 1 930 579 | 6/2008 |
| EP | 2 159 403 | 3/2010 |
| FR | 2 942 457 | 8/2010 |
| GB | 1 386 232 | 3/1975 |
| GB | 1 417 504 | 12/1975 |

\* cited by examiner

PIPE HAVING AN UPSTREAM CORE HAVING A SHARP CURVATURE

The present invention relates to the field of turbine engines, in particular aeronautic turbine engines such as airplane engines.

The invention more particularly relates to a turbine engine pipe, in which the working fluid circulates during normal operation from upstream to downstream, comprising, at its downstream end, an outer wall and a core whereof the upstream part is surrounded by said outer wall and whereof the downstream part extends said upstream part downstream from said outer wall, the border between the upstream part and the downstream part being defined by the intersection between the core and the surface formed by the bisectors of the acute angles formed by the straight lines perpendicular to said outer wall and passing through the downstream end of said outer wall and the straight lines perpendicular to the outer face of said core and passing through the downstream end of the outer wall, the space between the outer wall and the upstream part of the core defining an end of the tunnel whereof the axis is a longitudinal axis A.

In the following description, the terms "upstream" and "downstream" are defined relative to the normal circulation direction of working fluid in the pipe.

The terms "inner" and "outer" indicate a part situated radially at, or oriented radially toward, the inside or outside, respectively, relative to the longitudinal axis of the pipe.

FIG. 1 diagrammatically shows a turbine engine (airplane engine) 1 in longitudinal cross-section. During normal operation, the working fluid, in this example formed by the area of the combustion gases, circulates from upstream to downstream, i.e., from left to right in FIG. 1. The turbine engine includes a pipe 2 whereof the downstream end includes an outer wall 100, and a core 200 (this core also being able to be called "plug"). The outer wall 100 and the core 200 are coaxial, the longitudinal axis being an axis A (in the illustrated case, the axis A is the same as the axis of the turbine engine. In some cases, the axis A may be inclined relative to the turbine engine axis). The outer wall 100 has a downstream end 105.

The upstream part 210 of the core 200 is surrounded by the outer wall 100. The space between said upstream part 210 and the outer wall 100 thus forms an annular tunnel 300 with longitudinal axis A.

The downstream end 230 of the core 200 extends said upstream part 210 downstream from the outer wall 100, i.e., said downstream part 230 is not surrounded by the outer wall 100.

The upstream part 210 and the downstream part 230 come together at a border 220. The positioning of this border 220 is defined as follows (see FIG. 3): At each point M of the downstream end 105 of the outer wall 100, a first straight line D1 is considered passing through that point M that is perpendicular to the outer wall 100, and a second straight line D2 passing through that point M that is perpendicular to the outer face 206 of the core 200, and the straight line D is defined as the bisector of the acute angle formed by the first straight line D1 and the second straight line D2. The set of straight lines D forms a surface S, and the intersection of said surface S with the outer face 206 of the core 200 constitutes the border 220 between the upstream part 210 and the downstream part 230. The portion of the surface S that extends between the outer face 206 and the outer wall 100 constitutes the downstream orifice of the annular tunnel 300.

FIG. 3 shows the downstream part of a pipe 2 according to the prior art, in longitudinal cross-section. In such a pipe 2, the downstream part 230 of the core 200 is conical and approaches the longitudinal axis A of the pipe 2 from upstream to downstream. In longitudinal cross-section, the outer face 236 of this downstream part 230 therefore forms two segments that are such that the straight lines that extend them intersect on the longitudinal axis A.

For symmetry reasons, only the half of the pipe above the longitudinal axis A is shown.

The downstream end 239 of the core 200 is substantially hemispherical, i.e., the side wall of the cone formed by the downstream part 230 curves at the apex of that cone (downstream end) to form a sphere portion. Alternatively, the apex of said cone may be truncated at its end, or extended by a cylindrical portion extending along the longitudinal axis A.

In all cases, the cone formed by the downstream part 230 of the core 200 has a small apical half-angle $\beta$. In fact, the outer face of the core 200 must have, at the downstream orifice of the annular tunnel, a slope relative to the longitudinal axis A that is separated by at most approximately 10° from the slope relative to that axis A of the outer wall 100. If the slope of the outer face of the core 200 is too much greater than the slope of the outer wall 100, the annular tunnel has excessively divergent downstream orifices (the annular tunnel flares at its outlet section), which is detrimental from an aerodynamic perspective. The apical half-angle $\beta$, which is directly related to the slope of the outer face of the core 200, is therefore necessarily small, in practice less than 21°.

Such a geometry makes it possible to minimize the aerodynamic disruptions caused by the core 200, and the manufacturing costs of the pipe 2. However, the core 200 then has a greater length, and is therefore heavier, which is detrimental.

To offset this drawback and save in terms of mass, one solution used in the prior art consists of truncating the downstream part 230 of the core 200 at approximately mid-length, at the dotted line in FIG. 3 that is therefore situated midway between the downstream orifice of the annular tunnel 300 and the downstream end 239 of the core 200. However, the wide downstream end of the core 200 resulting from this truncation causes an aerodynamic performance penalty that counterbalances the mass savings.

Although in the state of the art, as for example in patent GB 1,417,504, pipes have been illustrated with cores having a more or less pronounced convexity in a longitudinal radial plane, it has proven very difficult to prevent unsticking of the boundary layer of the working fluid from the outer surface of the core, causing turbulence downstream of the pipe and possible output losses. This phenomenon is particularly pronounced when the turbine engine is a reaction engine mounted below an aircraft wing pylon. In that case, the interference of the propulsion jet with the pylon facilitates unsticking of the boundary layer.

The present invention aims to resolve these drawbacks.

The invention aims to propose a pipe that is lighter than the existing pipes, while preserving its aerodynamic performance.

This aim is achieved owing to the fact that the outer face of the downstream part of the core has, downstream from the border, a sharply curved convex region at each point of which the radius of curvature R, in the longitudinal radial plane, is smaller than a first radius R1 equal to 30 times a radius of curvature H of the core in a transverse plane at a point of intersection of said border and said longitudinal radial plane, and a first region with a small curvature, between said border and said sharply curved convex region, at each point of which the radius of curvature R in said longitudinal radial plane is greater than a second radius R2 equal to 10 times said first radius R1.

Owing to these provisions, mass savings are obtained for the pipe relative to the existing pipes, and aerodynamic performance levels are obtained for the pipe at least equal to those of the existing pipes. The transition through the first region of weak curvature toward the sharply curved convex region makes it possible to attenuate the aerodynamic effects tending toward ungluing of the boundary layer of the surface of the core. Thus, the stability of the flow is improved, and fuel consumption is therefore reduced.

In order to facilitate the transition toward the sharply curved convex region, the first region with a weak curvature may in particular have a length smaller than 0.02 times the radius of curvature H. However, to limit the total length of the core, said first region with a weak curvature may have a length not greater than 0.8 times the radius H, and/or not greater than 0.55 times the distance between said border and a downstream end of the core in the direction of the longitudinal axis A. Unless otherwise indicated, "lengths", in the present context, refer to axial lengths in the direction of the longitudinal axis A.

In order also to limit the bulk while ensuring the stability of the flow of the working fluid downstream from the border, said sharply curved convex region may have a length not less than 1.9 times the radius H and/or not greater than 2.7 times the radius H. The invention will be well understood and its advantages will better appear upon reading the following detailed description of one embodiment, shown as a non-limiting example. The description refers to the appended drawings, in which:

FIG. 1 diagrammatically shows a turbine engine in longitudinal cross-section,

FIG. 2 shows the downstream part of a pipe 1 according to the invention, extending along a longitudinal axis A. For symmetry reasons, only the half of the pipe 1 above the longitudinal axis A is shown.

Figure 1:
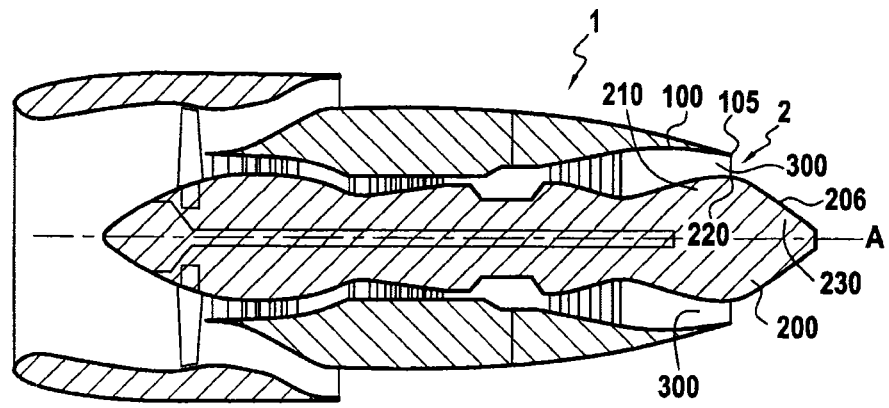

At the downstream orifice of the annular tunnel 300, i.e., at the border 220, the outer wall 100 of the pipe and the outer face 206 of the core 200 form a small angle between them, which is at most approximately 10°.

Immediately downstream from the border 220 is the downstream part 230 of the core 200. According to the invention, the outer face 236 of said downstream part 230 of the core 200 has, in a longitudinal radial plane, near the border 220, a sharply curved convex region 250.

The expression "near" means that this sharply curved convex region 250 is situated in the first third of the total length of the downstream part 230 of the core 200, i.e., within the 33% of said downstream part 230 that is furthest upstream.

"Sharp curvature" refers to a curvature whereof the radius of curvature is smaller than a first radius R1 equal to 30 times the radius H of the core 200 at the border 220. This radius of curvature is defined in a radial plane, i.e., a plane containing the longitudinal axis A. This radius of curvature of the outer face 236 is thus defined, at a point P of the outer face 236, as the radius R of a circle contained in said longitudinal radial plane, passing through said point P, and fitting the outer face 236 as closely as possible. This radius R is given by the formula:

$$\frac{1}{R} = \frac{\ddot{y}}{(1+\dot{y}^2)^{3/2}}$$

where y(x) is the equation of the curve formed by the intersection of the outer face and said radial plane, $\dot{y}$ is the first derivative of y relative to x, and $\ddot{y}$ is the second derivative of y relative to x.

Figure 2:
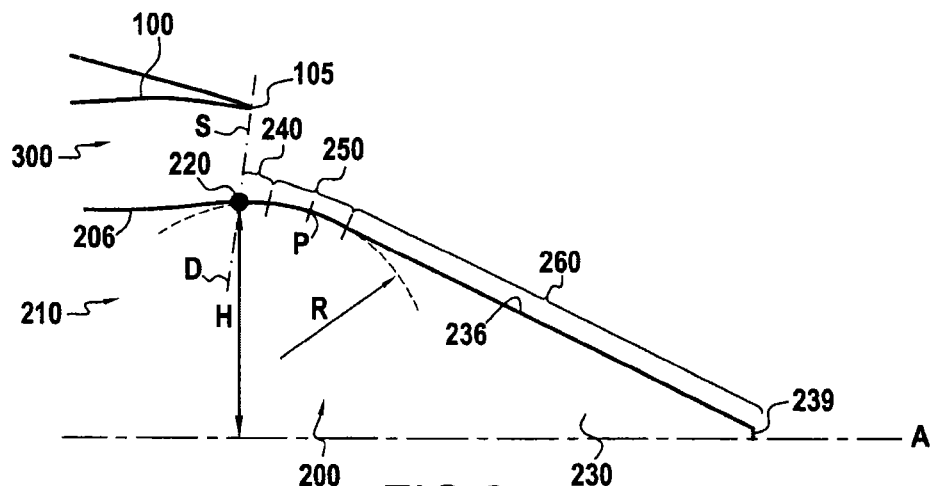
FIG. 2 shows the downstream part of a pipe according to the invention.
Figure 3:
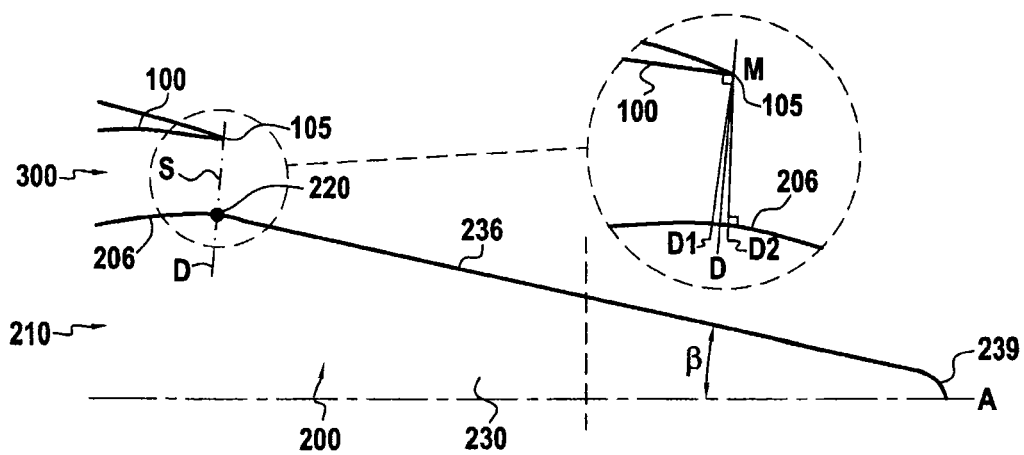
FIG. 3 shows the downstream part of a pipe according to the prior art.

In the case at hand, this plane (x,y) is a radial plane containing the longitudinal axis A. In FIG. 2, this is the plane of the sheet.

In the axisymmetric pipe of the illustrated embodiment, the border 220 extends in a transverse plane perpendicular to the longitudinal axis A and forms a circle centered on that axis. However, in other alternative embodiments with non-axisymmetric pipes, this border 220 may be elliptical, with a ratio between the minor diameter and the major diameter of the ellipse that may be as low as 0.85.

As shown in FIG. 2, the radius H is the radius of said border 220 in said transverse plane at the point of intersection of the border 220 with the illustrated longitudinal radial plane. The radius of curvature R at a point P of the sharply curved region 250 in that same longitudinal radial plane is shown in FIG. 2.

Thus, at any point P of the sharply curved convex region 250 of the outer face 236 of the downstream part of the core 200, the radius of curvature R is smaller than the first radius R1.

The flare at the outlet of the annular tunnel 300 due to the sharp curvature toward the longitudinal axis A at the sharply curved convex region 250 causes slowing of the air at that point, and therefore recompression of the air.

Surprisingly, numerical studies conducted by the inventors have shown that this recompression did not cause any detrimental unsticking of the boundary layer in that sharply curved region 250. On the contrary, using the core according to the invention, a reduction of 0.3% is obtained for the specific fuel consumption of the turbine engine provided with such a pipe according to the invention.

Advantageously, the radius of curvature R at each point of the sharply curved convex region 250 is smaller than half of the first radius R1.

The mass of the turbine engine equipped with such a pipe is then further reduced, which is advantageous.

In order to ensure the stability of the flow, this sharply curved region may in particular have a length between 1.9 and 2.7 times the radius H.

It is preferable, from an aerodynamic perspective (stability of the flow) and therefore fuel consumption perspective, for the sharply curved convex region 250 not to be directly adjacent to the border 220. In particular, it may be preferable for the transition from a weak or nonexistent curvature on the border 220 to the sharp curvature in the sharply curved convex region 250 to occur gradually.

Thus, it is advantageous for the outer face 236 to have, between the border 220 and the sharply curved convex region 250, a first weak curvature region 240 at each point of which any radius of curvature in a longitudinal radial plane is greater than a second radius R2 equal to 10 times the first radius R1.

For example, this first weak curvature region 240 forms the entire outer face 236 situated between the border 220 and the sharply curved convex region 250.

The tests done by the inventors have shown that it is advantageous for this first weak curvature region 240 to have a length greater than 1 cm, measured along the outer face 236. In particular, the length of this weak curvature region 240 may be an axial length, i.e., measured on the longitudinal axis A, of between 0.02 and 0.8 times the radius H.

Downstream from this sharply curved convex region 250, the core 200 has a second weak curvature region 260, in which any radius of curvature (in a longitudinal radial plane) is greater than the first radius R1. This smaller curvature contributes to preventing unsticking of the boundary layer from occurring on the outer face 236.

Advantageously, the outer face 236 has, downstream from the sharply curved convex region 250, a second weak curvature region 260 at each point of which any radius of curvature in a radial plane is greater than a second radius R2 equal to 10 times the first radius R1.

The second weak curvature region 260 begins immediately downstream from the sharp curvature region 250.

In the present context, "weak curvature regions" refers to regions in which the curvature may also be nonexistent. For example, these first and second weak curvature regions 240, 260 may be straight, i.e., the outer face 236 is conical in these weak curvature regions 240, 260.

For example, the second weak curvature region 260 forms the entire outer face 236 situated downstream from the sharply curved region 250.

The downstream end 239 of the core 200 is truncated, as shown in FIG. 2.

Alternatively, this downstream end 239 is substantially hemispherical, or extended by a cylindrical portion.

In all cases, according to the invention, a length reduction is obtained along the longitudinal axis A of the downstream part 230 of the core 200 of at least 20% with respect to a core of a pipe according to the prior art.

The invention claimed is:

1. A turbine engine pipe, in which a working fluid circulates during normal operation from upstream to downstream, comprising:
   at a downstream end, an outer wall and a core, an upstream part of the core surrounded by the outer wall and a downstream part of the core extends the upstream part downstream from the outer wall,
   a border between the upstream part and the downstream part being defined by an intersection between the core and a surface formed by bisectors of acute angles formed by straight lines perpendicular to the outer wall and passing through the downstream end of the outer wall and straight lines perpendicular to an outer face of the core and passing through the downstream end of the outer wall,
   a space between the outer wall and the upstream part of the core defining an annular tunnel having a longitudinal axis, a portion of the surface which extends between the outer face and the outer wall constitutes a downstream orifice of the annular tunnel,
   wherein the outer face of the downstream part of the core includes, downstream from the border, a sharply curved convex region at each point of which the radius of curvature, in the longitudinal radial plane, is smaller than a first radius equal to 30 times a radius of curvature of the core in a transverse plane at a point of intersection of the border and the longitudinal radial plane,
   the sharply curved convex region being situated within 33% of the downstream part of the core that is furthest upstream, and a first convex region with a smaller curvature, between the border and the sharply curved convex region, at each point of which the radius of curvature in the longitudinal radial plane is greater than a second radius equal to 10 times the first radius.

2. The pipe according to claim 1, wherein, at each point of the sharply curved convex region, its radius of curvature is less than half of the first radius.

3. The pipe according to claim 1, wherein the first region with a smaller curvature has a length smaller than 0.02 times the radius of curvature of the core.

4. The pipe according to claim 3, wherein the first region with a smaller curvature has a length not greater than 0.8 times the radius of curvature of the core.

5. The pipe according to claim 3, wherein the first region with a smaller curvature has a length not greater than 0.55 times the distance between the border and a downstream end of the core in the direction of the longitudinal axis.

6. The pipe according to claim 1, wherein the sharply curved convex region has a length not less than 1.9 times the radius of curvature of the core.

7. The pipe according to claim 6, wherein the sharply curved convex region has a length not greater than 2.7 times the radius of curvature of the core.

8. The pipe according to claim 1, wherein the outer face of the downstream part of the core includes, downstream from the sharply curved convex region, a second convex region with a smaller curvature at each point of which any radius of curvature in a longitudinal radial plane is greater than a second radius equal to 10 times the first radius.

9. The pipe according to claim 1, wherein the downstream end of the core is truncated.

\* \* \* \* \*